US005328395A

United States Patent [19]

Oishi

[11] Patent Number: 5,328,395

[45] Date of Patent: Jul. 12, 1994

[54] COWLING STRUCTURE FOR MARINE PROPULSION ENGINE

[75] Inventor: Hiroshi Oishi, Hamamatsu, Japan

[73] Assignee: Sanshin Kogyo Kabushiki Kaisha, Hamamatsu, Japan

[21] Appl. No.: 69,974

[22] Filed: May 28, 1993

[30] Foreign Application Priority Data

Jun. 30, 1992 [JP] Japan .................................. 4-194714

[51] Int. Cl.[5] .............................................. B63H 21/24

[52] U.S. Cl. ........................................ 440/77; 440/88; 123/195 P

[58] Field of Search ................. 440/77, 88; 123/195 P

[56] References Cited

U.S. PATENT DOCUMENTS 4,403,971 9/1983 Kobayashi et al. ................... 440/88

5,181,871 1/1993 Hiraoka et al. ....................... 440/77

FOREIGN PATENT DOCUMENTS 60-222394 6/1985 Japan .

*Primary Examiner*—Jesus D. Sotelo

*Attorney, Agent, or Firm*—Knobbe, Martens, Olson & Bear

[57] ABSTRACT

An outboard motor and particularly an improved protective cowling for an outboard motor that provides a very simple air inlet but one which is effective in preventing the passage of water to the interior of the protective cowling and for separating and draining water from the inducted air. The drained water is returned directly to the atmosphere. The air inlet system for the protective cowling is formed by only two members so as to facilitate a simple and low cost construction.

25 Claims, 3 Drawing Sheets

27 34 28 46 39 35 36 41 23 43 26 45 38 42 44 31 29 37 33 32 15 14

COWLING STRUCTURE FOR MARINE PROPULSION ENGINE

BACKGROUND OF THE INVENTION

This invention relates to a cowling structure for a marine propulsion engine and more particularly to an improved protective cowling for the power head of an outboard motor.

As is well know, it is the normal practice in outboard motors to contain the powering internal combustion engine in a protective cowling which will insure that the engine and its auxiliaries do not become wet and subject to corrosion. However, it is also necessary to provide atmospheric air to the engine for its combustion. A wide variety of air induction systems have been proposed for outboard motors which serve the main purpose of providing copious air flow to the engine for combustion but also for separating water from the inducted air so that the water cannot be drawn with the inducted air into the interior of the protective cowling where it could contaminate the engine and cause corrosion and other problems.

However, the types of air ducts proposed previously have required at least one portion that has a relatively small effective opening area so as to reduce the emanation of noises from the engine back to the atmosphere. When such small openings are provided, the water which may be entrained in the air tends to condense on the surface surrounding the opening. The restricted opening causes the air flow to accelerate and thus the condensed water is again swept back into the air stream and can find its way into the protective cowling. Thus, it is necessary to provide some drain in the lower portion of the protective cowling that permits water to drain from the area around the engine.

In addition to these problems, the protective cowling has been formed with a labyrinthine type of construction so as to cause the air flow to have to turn through several directions so as to further assist in water separation. However, these types of devices further cause the likelihood of condensed water to be trapped in the protective cowling and again swept into the air stream. In an addition, these complicated configurations are very expensive to manufacture and/or require multiple pieces for the protective cowling.

It is, therefore, a principal object to this invention to provide an improved protective cowling structure for an outboard motor.

It is a further object to this invention to provide an improved and simplified air inlet system for an outboard motor protective cowling which will separate water from the inducted air and which will also permit the separated water to drain away from the interior of the protective cowling and back to the atmosphere.

It is a further object to this invention to provide an improved and simplified air inlet device for the protective cowling of an outboard motor.

SUMMARY OF THE INVENTION

This invention is adapted to be embodied in a cowling arrangement for the power head of an outboard motor for protecting an enclosed internal combustion engine from water while permitting adequate air flow from the atmosphere to the engine for combustion. The cowling includes means forming an upwardly facing air outlet duct that communicates with the interior of the cowling for supplying air to the engine and which is surrounded by a surface having a downwardly sloping portion. A further portion of the cowling has a part which extends in confronting relation to the air outlet duct and which defines with the surrounding surface an air cavity. Means define an air inlet opening communicating the cavity with the atmosphere for atmospheric air flow into the cavity. Means also define a water drain communicating the lower area of the downwardly sloping portion with the atmosphere for draining of water from the cavity to the atmosphere and away from the air outlet duct.

Another feature of the invention is also adapted to be embodied in a cowling arrangement for the power head of outboard motor for protecting an enclosed internal combustion engine from water while permitting adequate air flow from the atmosphere to the engine for combustion. The cowling includes means forming an upwardly facing tubular air outlet duct communicating with the interior of the cowling for supplying air to the engine. The cowling has means which enclose the air outlet duct and define a cavity therearound. An air inlet duct is formed in the cowling and which has an inlet opening that communicates with the atmosphere, an upwardly extending duct portion extending from the inlet opening within the cavity and an outlet opening formed at an upper portion of the cavity but below the air outlet duct.

DETAILED DESCRIPTION OF THE PREFERRED EMBODIMENT OF THE INVENTION

Figure 1:
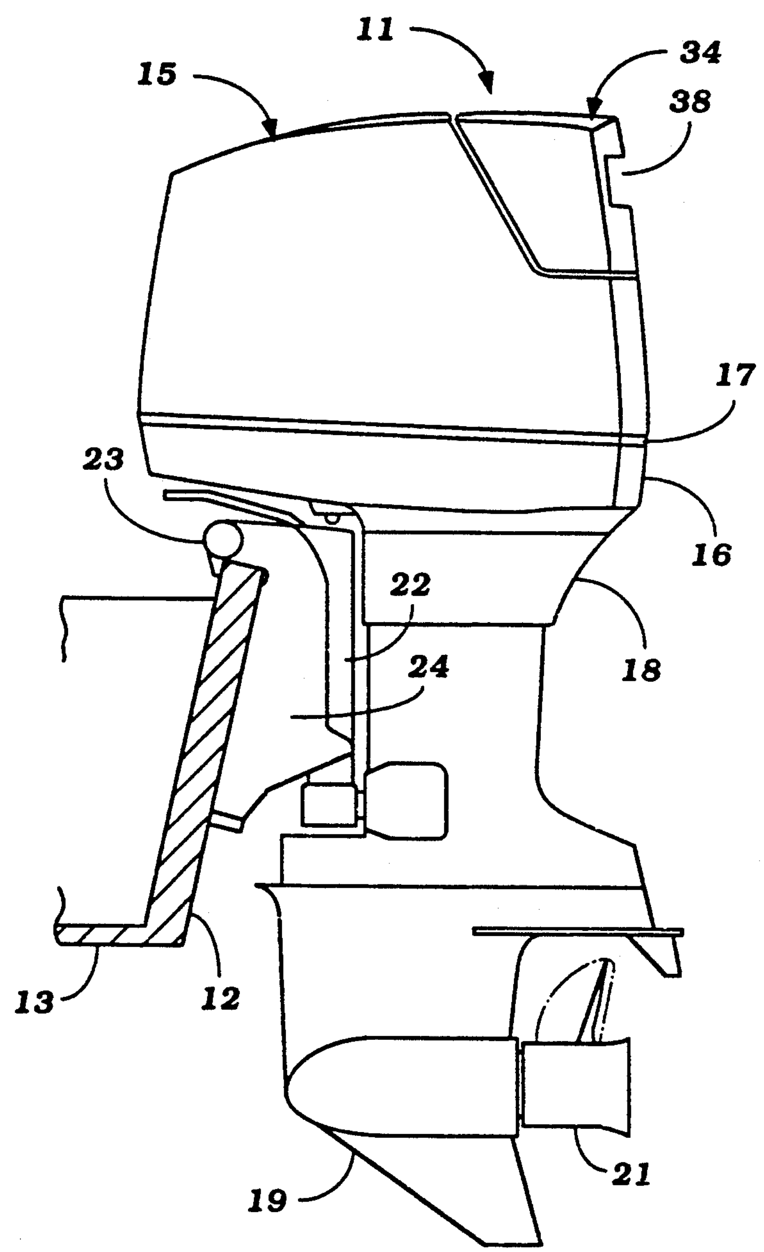
FIG. 1 is a side elevational view of an outboard motor constructed in accordance with an embodiment of the invention.

Referring now in detail to the drawings and initially to FIG. 1, an outboard motor constructed in accordance with an embodiment of the invention is identified generally by the reference numeral 11 and is shown as attached to the transom 12 of an associated watercraft 13 which is shown partially and in cross section.

Figure 2:
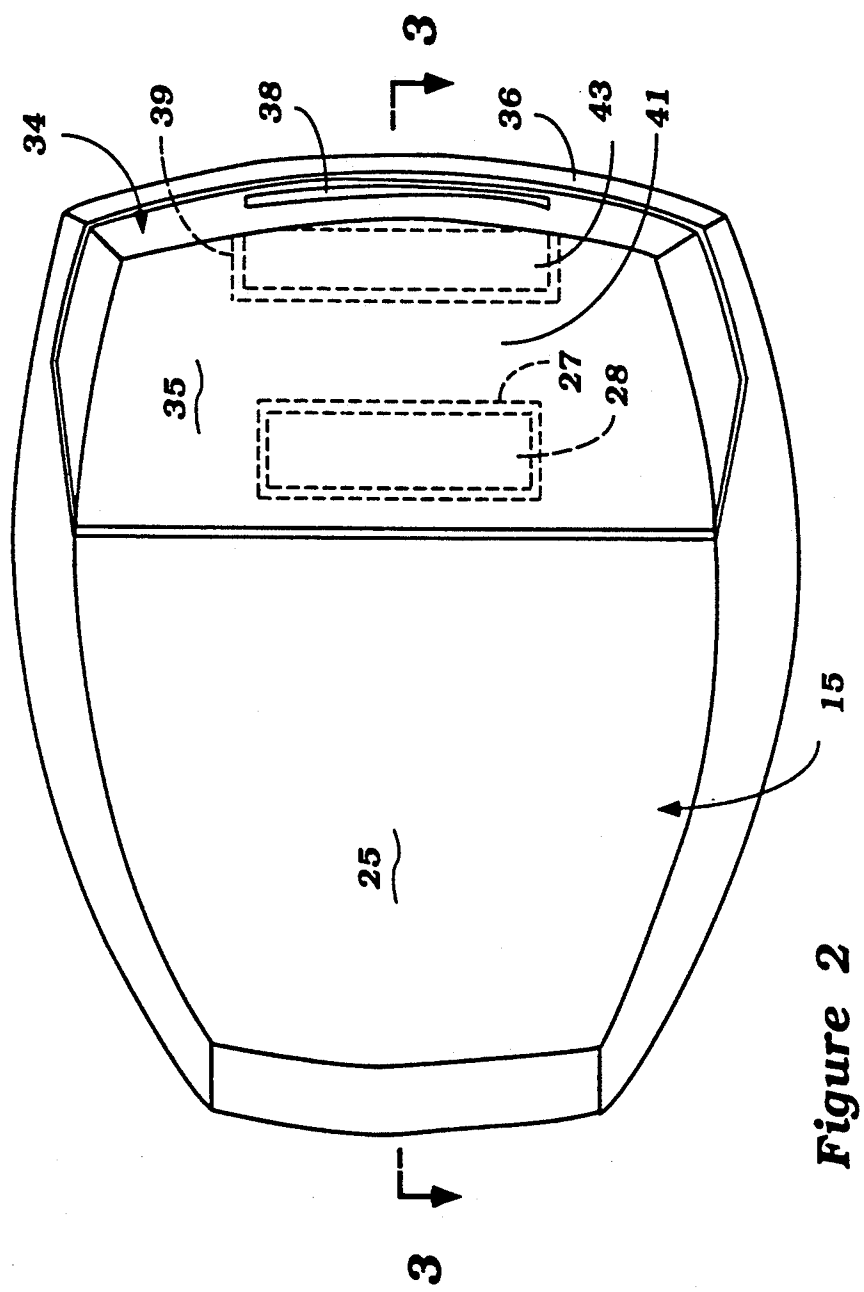
FIG. 2 is an enlarged top plan view of the protective cowling of the outboard motor.
Figure 3:
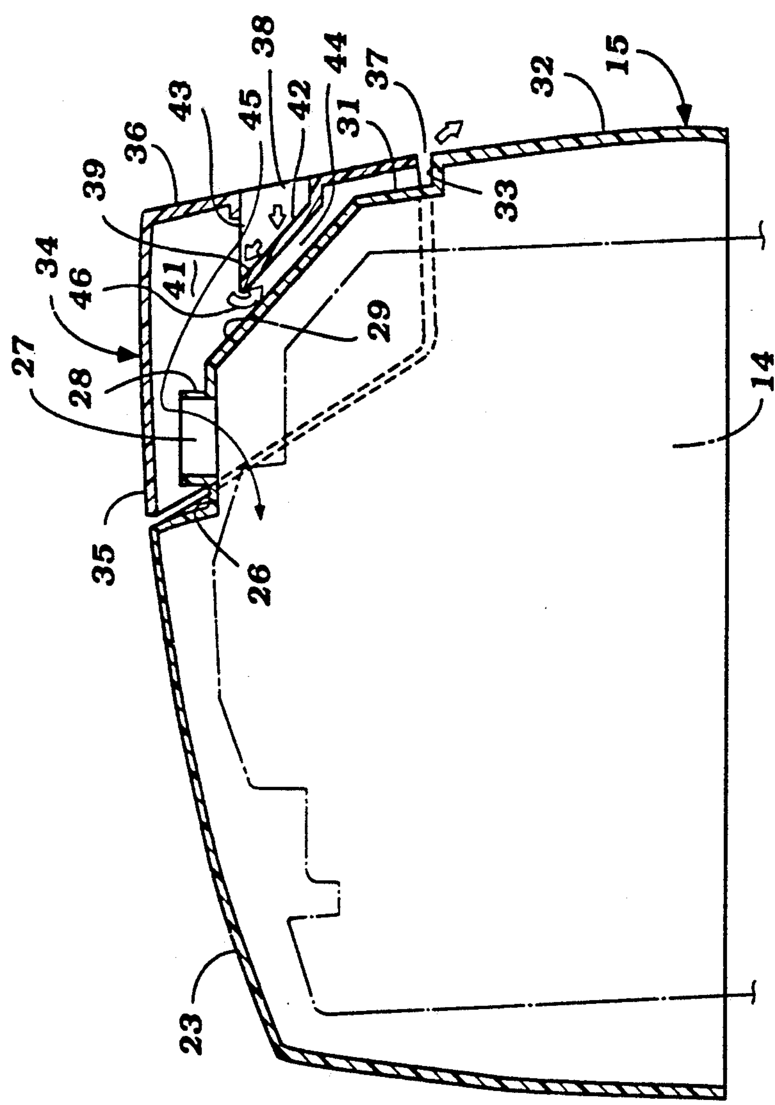
FIG. 3 is a cross sectional view taken along the line 3—3 of FIG. 2 and showing only the upper cowling portion with the associated internal combustion engine being shown in phantom.

The outboard motor 11 includes a power head which is comprised of an internal combustion engine, shown only in phantom in FIG. 3 and identified generally by the reference numeral 14 and which may be of any known type. This internal combustion engine 14 is contained within a protective cowling comprised of a main cowling portion 15 which is detachably connected to a tray 16 with a sealing gasket 17 being interposed therebetween. Further details of the protective cowling will be described later by reference additionally to FIGS. 2 and 3.

The engine 14, as is typical with outboard motor practice, has its output shaft rotating about a vertically extending axis and connected to a drive shaft which is mounted for rotation within a drive shaft housing 18 which depends from the tray 16. This drive shaft (not shown) extends into a lower unit 19 wherein there is contained a forward, neutral and reverse transmission of a known type for selectively driving a propeller 21 in forward and reverse directions.

A steering shaft (not shown) is fixed to the drive shaft housing 18 in a known manner and is journalled for steering movement about a vertically extending steering axis within a swivel bracket 22. The swivel bracket 22 is, in turn, pivotally connected by means of a pivot pin 23 to a clamping bracket 24 for tilt and trim movement of the outboard motor 11 relative to the clamping bracket 24. The clamping bracket 24 is provided with suitable means for attachment to the transom 12 of the watercraft 13 in a well known manner.

Except for the construction of the main cowling portion 15, the construction of the outboard motor 11 as thus far described may be considered to be conventional. Since the invention deals primarily with the upper cowling member 15 and the air inlet system therefore, further description of the outboard motor 11 is not believed to be necessary to understand the construction and operation of the invention.

Referring now additionally to FIGS. 2 and 3, the main cowling portion 15 has a generally inverted cup-shape and is formed from a suitable material such as a molded fiberglass reinforced plastic. The cowling member 15 has a generally curved horizontally extending upper surface 25 which terminates at approximately two-thirds of the way back and therein is formed with a recessed horizontally extending surface 26 which has an upstanding tubular or rectangular portion 27 that defines a air outlet duct 28 that communicates the interior of the protective cowling with the atmosphere in a manner which will be described.

Rearwardly of the horizontal surface 26, the cowling member 15 has an angularly inclined downwardly sloping portion 29 that terminates in a vertically extending surface 31 that is formed immediately adjacent the back or rear surface 32 of the cowling member 15 and which is offset therefrom by a further horizontally extending surface 33. An atmospheric air inlet forming member, indicated generally by the reference numeral 34, is provided and is also formed from a molded fiberglass reinforced plastic or a similar material. The air inlet forming member 34 is affixed to the main cowling member 15 by means of a plurality of interlocking projections formed on the main cowling member 15 and the air inlet forming member 34 at spaced locations (not shown). Preferably, this construction permits a snap fit.

The air inlet forming member 34 has a horizontally disposed upper surface 35 which forms an extension of the main cowling member top surface 25. In addition, the air inlet forming member 34 has a generally vertically extending rear surface 36 which, in effect, forms an extension of the main cowling member back surface 32. It should be noted that the air inlet forming member 34 forms a slight gap 37 around its periphery which is spaced from the corresponding surfaces of the main cowling member 15 with the lower portion of this gap 37 being aligned with the ledge 33 of the main cowling member 15 so as to form a water drain, as will become apparent.

The air inlet forming member 34 is also formed with a rearwardly facing atmospheric air inlet opening 38 through which atmospheric air may be drawn. This air inlet opening 38 is surrounded by a duct forming portion 39 which extends inwardly into a cavity 41 formed around the main cowling member air outlet duct 28 and its surfaces 26, 29, 31 and 33. This duct extends generally upwardly so as to form an inclined surface 42 that is in facing relationship with the air inlet opening 38 and which terminates at a horizontally extending air outlet opening 43 that communicates the air inlet opening 38 with the cavity 41. It should be noted that a relatively restricted air channel 44 is provided between the rear surface of the duct portion 42 and the inclined surface 29 of the main cowling member 15.

Air which enters the air inlet opening 38 is deflected by the back wall 42 of the duct 39 upwardly toward the under surface of the top portion 36 of the air inlet member 34. This air then must turn and flow downwardly through the air outlet duct 28 for induction into the engine 14. The path of air flow is indicated by the arrow 45 in FIG. 3. Thus, it should be readily apparent that the air must turn through several angles before it can flow into the interior of the protective cowling. Heavier water particles, however, will be condensed primarily by their impingement on the inclined wall 42 and any water particles which may be swept by the air flow through the duct 39 will drop by gravity in the recess 44 as shown by the arrows 46. This water will then drain by gravity down the inclined top cowling portion surface 29 and be drained out of the drained opening 37 formed in conjunction with the horizontal surface 33 of the main cowling member 15.

It should also be noted that the rearwardly positioned air inlet opening 38 and duct 39 also provide an area where an operator may put his hand so as to assist in tilting the outboard motor 11 up about the axis defined by the pivot pin 23.

It should be readily apparent that the described construction is very effective in provided a copious supply of atmospheric air for the induction of the engine while at the same time separating water and causing the separated water to drain away from the path of air flow and back to the atmosphere without passing through the air outlet duct. Also, the construction can be easily molded as should be readily apparent and only a two piece construction is required so as to achieve these purposes. Of course, the foregoing description is a preferred embodiment of the invention and various changes and modification may be made without departing from the spirit and scope of the invention, as defined by the appended claims.

I claim:

1. A cowling arrangement for the power head of an outboard motor for protecting an enclosed internal combustion engine from water while permitting adequate air flow from the atmosphere to the engine for combustion, said cowling including means forming an upwardly facing air outlet duct communicating with the interior of said cowling for supplying air to the engine and surrounded by a surface having a downwardly sloping portion, a further portion of said cowling have a part extending in confronting relation to said air outlet duct and defining with said surrounding surface an air cavity, means defining an air inlet opening communicating said cavity with the atmosphere for atmosphere air flow into said cavity, and means defining a water drain separate from said air inlet opening and communicating a lower area of said downwardly sloping portion directly with the atmosphere externally of said cowling for draining of water from said cavity to the atmosphere and away from said air outlet duct.

2. A cowling arrangement for the power head of an outboard motor as set forth in claim 1 wherein the air inlet opening communicates with an air inlet duct that extends in a generally upward direction into the cavity.

3. A cowling arrangement for the power head of an outboard motor as set forth in claim 2 wherein the air inlet duct forms a complete enclosure around the periphery of the air inlet opening.

4. A cowling arrangement for the power head of an outboard motor as set forth in claim 3 wherein the air inlet opening is disposed below the air outlet duct.

5. A cowling arrangement for the power head of an outboard motor as set forth in claim 4 wherein the outlet end of the air inlet duct is disposed below the air outlet duct.

6. A cowling arrangement for the power head of an outboard motor as set forth in claim 5 wherein the air inlet opening is formed in a rear surface of the protective cowling.

7. A cowling arrangement for the power head of an outboard motor as set forth in claim 6 wherein the water drain is positioned below the air inlet opening.

8. A cowling arrangement for the power head of an outboard motor as set forth in claim 1 wherein the water drain is positioned below the air inlet opening.

9. A cowling arrangement for the power head of an outboard motor as set forth in claim 8 wherein the air inlet opening and the water drain are both formed in a rear surface of a protective cowling.

10. A cowling arrangement for the power head of an outboard motor as set forth in claim 1 wherein the air outlet duct is surrounded by an upstanding wall.

11. A cowling arrangement for the power head of an outboard motor as set forth in claim 10 wherein the downwardly sloping portion of the cowling extends from adjacent one side of the air outlet duct.

12. A cowling arrangement for the power head of an outboard motor as set forth in claim 11 wherein the further cowling portion and the downwardly sloping portion define a restricted channel through which water may flow.

13. A cowling arrangement for the power head of an outboard motor as set forth in claim 1 wherein the cowling is defined by a main cowling piece forming the air outlet duct and the surrounding surface and wherein the further cowling portion is formed of a separate piece connected to the main cowling piece.

14. A cowling arrangement for the power head of an outboard motor as set forth in claim 13 wherein the air inlet opening communicates with an air inlet duct that extends in a generally upward direction into the cavity.

15. A cowling arrangement for the power head of an outboard motor as set forth in claim 14 wherein the air inlet duct forms a complete enclosure around the periphery of the air inlet opening.

16. A cowling arrangement for the power head of an outboard motor as set forth in claim 15 wherein the air inlet opening is disposed below the air outlet duct.

17. A cowling arrangement for the power head of an outboard motor as set forth in claim 16 wherein the outlet end of the air inlet duct is disposed below the air outlet duct.

18. A cowling arrangement for the power head of an outboard motor as set forth in claim 17 wherein the air inlet opening is formed in a rear surface of the protective cowling.

19. A cowling arrangement for the power head of an outboard motor as set forth in claim 18 wherein the water drain is positioned below the air inlet opening.

20. A cowling arrangement for the power head of an outboard motor as set forth in claim 13 wherein the water drain is positioned below the air inlet opening.

21. A cowling arrangement for the power head of an outboard motor as set forth in claim 20 wherein the air inlet opening and the water drain are both formed in a rear surface of a protective cowling.

22. A cowling arrangement for the power head of an outboard motor as set forth in claim 13 wherein the air outlet duct is surrounded by an upstanding wall.

23. A cowling arrangement for the power head of an outboard motor as set forth in claim 22 wherein the downwardly sloping portion of the cowling extends from adjacent one side of the air outlet duct.

24. A cowling arrangement for the power head of an outboard motor as set forth in claim 23 wherein the further cowling portion and the downwardly sloping portion define a restricted channel through which water may flow.

25. A cowling arrangement for the power head of an outboard motor for protecting an enclosed internal combustion engine from water while permitting adequate air flow from the atmosphere to the engine for combustion, said cowling including means forming an upwardly facing air outlet duct communicating with the interior of the said cowling for supplying air to said engine, a further portion of said cowling having a part extending in confronting relationship to said air outlet duct and defining an air cavity around said air outlet duct, said further portion solely defining an air inlet opening and communicating with said cavity and an air inlet duct extending in surrounding relationship to said air inlet opening into said cavity in an upwardly directed direction for supplying atmosphere air to said air outlet duct.

* * * * *